(12) United States Patent
Grein et al.

(10) Patent No.: US 12,528,344 B2
(45) Date of Patent: Jan. 20, 2026

(54) INTERIOR SWING DOOR WITH SEALING PROFILE AND VEHICLE WITH THE INTERIOR SWING DOOR

(71) Applicant: Gummi-Welz GmbH & Co. KG Gummi-Kunststofftechnik-Schaumstoffe, Neu-Ulm (DE)

(72) Inventors: Horst Grein, Schrecksbach (DE); Toni Schumann, Neu Ulm (DE)

(73) Assignee: Gummi-Welz GmbH & Co. KG Gummi-Kunststofftechnik-Schaumstoffe, Neu-Ulm (DE)

( * ) Notice: Subject to any disclaimer, the term of this patent is extended or adjusted under 35 U.S.C. 154(b) by 402 days.

(21) Appl. No.: 18/098,900

(22) Filed: Jan. 19, 2023

(65) Prior Publication Data
US 2023/0241952 A1 Aug. 3, 2023

(30) Foreign Application Priority Data
Jan. 28, 2022 (EP) .................................... 22153972

(51) Int. Cl.
*B60J 10/86* (2016.01)
*B60J 5/04* (2006.01)
(52) U.S. Cl.
CPC .............. *B60J 10/86* (2016.02); *B60J 5/047* (2013.01)
(58) Field of Classification Search
CPC ........ B60J 10/86; B60J 5/0477; B60J 5/0479; B60J 5/0497
See application file for complete search history.

(56) References Cited

U.S. PATENT DOCUMENTS

| | | | | |
|---|---|---|---|---|
| 4,346,931 A | * | 8/1982 | Merkle | B61D 19/02 160/199 |
| 12,049,778 B1 | * | 7/2024 | Weinerman | E05F 15/73 |

(Continued)

FOREIGN PATENT DOCUMENTS

| | | |
|---|---|---|
| CN | 206374534 U | 8/2017 |
| CN | 107539084 B | 12/2020 |

(Continued)

OTHER PUBLICATIONS

Extended European Search Report, European Patent Application No. 22153972.9, Jul. 19, 2022, 10 pages, (with concise explanation of relevance).

(Continued)

*Primary Examiner* — Jason S Morrow
(74) *Attorney, Agent, or Firm* — WTA IP Law P.C.

(57) ABSTRACT

The invention relates to an interior swing door, preferably for a vehicle, comprising: a door panel and a portal, in which a swinging motion into an interior is executable by the door panel to open or close the interior, wherein, in the swinging motion, the door panel travels at least partly beyond an area formed by the portal and the door panel in the closed state, wherein the portal comprises a sealing member horizontally extending in an upper area, which, in the closed state, overlies the interior swing door in an upper area of the door panel, wherein the door panel comprises at least one door panel element and at least one vertically extending sealing profile that is mounted at the door panel element and, in the closed state, comes to rest against another sealing profile or the portal, wherein the vertically extending sealing profile has a lower height than the door panel element so that the vertically extending sealing profile, in a swinging motion of the door panel, travels through underneath the horizontally (Continued)

extending sealing member without contacting the horizontally extending sealing member.

20 Claims, 8 Drawing Sheets

(56) References Cited

U.S. PATENT DOCUMENTS

| | | | |
|---|---|---|---|
| 12,258,051 B2* | 3/2025 | Guggenbichler | B61D 19/008 |
| 2019/0255923 A1* | 8/2019 | Salles | B61D 19/026 |

FOREIGN PATENT DOCUMENTS

| | | |
|---|---|---|
| JP | H0248222 A | 2/1990 |
| JP | H10119582 A | 5/1998 |
| JP | H11334365 A | 12/1999 |
| PL | 424510 A1 | 8/2019 |

OTHER PUBLICATIONS

Examination report of the corresponding Indian Application No. 202344003946 mailed on Oct. 10, 2025.

\* cited by examiner

INTERIOR SWING DOOR WITH SEALING PROFILE AND VEHICLE WITH THE INTERIOR SWING DOOR

CROSS-REFERENCE TO RELATED APPLICATIONS

This application claims priority to European Patent Application No. 22 153 972.9 filed on Jan. 28, 2022, which is incorporated by reference herein in its entirety.

TECHNICAL FIELD

The invention relates to an interior swing door with a sealing profile, especially for a vehicle. Further, the invention relates to a vehicle with the interior swing door.

BACKGROUND ART

Interior swing doors are known from the art. Interior swing doors are employed especially in vehicles, e.g., in busses. The interior swing door may comprise a door portal and a door panel. The door panel of such an interior swing door usually comprises a sealing profile abutting against another sealing profile of another interior swing door or against the door portal when the interior swing door is closed. The door portal may comprise a horizontally extending sealing member overlying the upper area of the interior swing door or contacting this area.

When opening or closing the interior swing door, i.e., during the pivoting motion, a section of the door panel travels through the area formed by the door and thus temporarily protrudes to the outside. This means, a section of the door panel may protrude out beyond an area or plane defined by the door panel and, if applicable, the door portal when the interior swing door is closed. The horizontally extending sealing member of the door portal may at least partly and/or temporarily be contacted by the door panel when the interior swing door is opened or closed, so that a section of the sealing profile of the door panel rubs against the horizontally extending sealing member and pushes it to the outside. Due to friction, the horizontally extending sealing member and/or the sealing profile of the door panel may wear out relatively quickly.

SUMMARY

Therefore, the invention is based on the object of providing an interior swing door by which wear of a sealing profile of a door panel of the interior swing door and/or wear of a horizontally extending sealing member of a door portal are reduced or avoided when the interior swing door is opened or closed.

Another object is to provide an interior swing door exhibiting high tightness when the interior swing door is closed.

Yet another object is to provide an interior swing door being manufacturable in a cost-effective manner.

At least one of the objects is solved by the independent claims. Developments of the invention are defined in the dependent claims.

Disclosed is an interior swing door, preferably an interior swing door for a vehicle. The interior swing door comprises a door panel and a portal. In the portal, the door panel may perform a swinging motion into an interior to open or close the interior. In the swinging motion, the door panel travels at least partly beyond an area formed by the portal and the door panel in the closed state. The portal comprises a sealing member extending horizontally in the upper area (of the portal). The horizontally extending sealing member overlies an upper area of the door panel in the closed state of the interior swing door. The door panel comprises at least one door panel element and at least one vertically extending sealing profile. The vertically extending sealing profile is attached to the door panel element. In the closed state, the vertically extending sealing profile comes to abut another sealing profile, especially another vertically extending sealing profile, or the portal. The vertically extending sealing profile has a lower height than the door panel element. In a swinging motion of the door panel, the vertically extending sealing profile travels underneath the horizontally extending sealing member without contacting the horizontally extending sealing member.

By the design of the door panel element and the vertically extending sealing profile, friction between the vertically extending sealing profile and the horizontally extending sealing member is avoided, thereby reducing wear of both elements.

An interior swing door may be understood as a door executing a pivoting motion for opening or closing an interior. In this course, at least a major portion of the door may be swung into the interior when the door is opened.

The interior swing door may be a single-leaf interior swing door or a double-leaf interior swing door.

The interior swing door may be an interior swing door for a vehicle. The vehicle preferably is a utility vehicle or a passenger vehicle. The vehicle may be a truck, a bus, or a train. Particularly preferable, the vehicle is a bus. The vehicle may be an elevator or a nacelle, e.g. a cable car nacelle. The vehicle may be an autonomous vehicle. An autonomous vehicle may be operated without direct control of a person and still participate, e.g., in road traffic.

The portal may be a door portal. The portal may be immobile in opening and/or closing the interior swing door, i.e., the portal may not change its position when the interior swing door opens or closes. The portal may be connected to a vehicle or be part of a vehicle. The portal may be a frame.

The interior may be an interior of a vehicle. The interior may be opened or closed by the interior swing door. When the interior is opened, a person may access the interior (through the opened interior swing door). When the interior is closed, a person may not access the interior (through the interior swing door), i.e., the person has no access to the interior if the interior swing door is closed.

The door panel may be a planar element. The door panel may move during opening and/or closing the interior swing door. By the door panel, access to the interior may be closed for a person when the interior swing door is closed. Similarly, access to the interior may be opened for a person by the door panel when the interior swing door is opened.

The door panel and/or the portal may define an area or plane when the interior swing door is closed. A (lateral) external cladding of the vehicle may lie in the area or plane. For example, the door panel may be flush with the external cladding of the vehicle, e.g. a bus, so that, substantially, a surface is formed by the door panel and the external cladding of the vehicle. The area or plane defined by the door panel and/or the portal may be penetrated at least partly during opening or closing the interior swing door of the door panel. In other words, at least a section of the door panel may project beyond the area or plane defined in the closed state of the interior swing door or protrude through the area or plane when the interior swing door is being opened or closed. The interior swing door may be opened or closed by a pivoting motion of the door panel.

The horizontally extending sealing member of the portal may serve to keep water (e.g. rainwater) off the door panel or to reduce water impacting on the door panel, respectively. Alternatively or additionally, the horizontally extending sealing member may serve as a privacy screen. Therefore, an air gap covered by the horizontally extending sealing member may be formed between the portal and the door panel. The horizontally extending sealing member may project beyond the area or plane defined by the door panel in the closed state of the interior swing door or protrude through the area or plane to intercept rainwater or to protect the entrance area of the interior swing door from above, respectively.

The horizontally extending sealing member is attached to the portal so that the door panel in the closed state at least partly abuts an inner area of the horizontally extending sealing member and is being overlayed by a sealing lip from the outside. The horizontally extending sealing member may comprise an attachment base or an attachment area by which it is attached to a profile (e.g., of metal) of the portal.

The horizontally extending sealing member may extend across the full width of the door panel. Similarly, the horizontally extending sealing member may extend, at most in sections, across the width of the door panel. The horizontally extending sealing member may be made in one single piece or in multiple pieces. The width may extend in the horizontal direction.

In general, the terms "above" and "below" may indicate an orientation in the gravitational direction. In this course, "above" may indicate an orientation against the gravitational direction and/or "below" may indicate an orientation in or along the gravitational direction. "Horizontal" may indicate an orientation perpendicular to the gravitational direction. "Vertical" may indicate an orientation in or along the gravitational direction.

The horizontally extending sealing member may comprise elastomer or rubber. The horizontally extending sealing member may consist of elastomer or rubber. For example, the horizontally extending sealing member comprises or consists of silicone or EPDM.

The door panel element of the door panel may be a rigid, inelastic, or inflexible element. The door panel element may comprise a partly or fully circumferential frame. Additionally or alternatively, the door panel element may comprise a translucent or transparent element, e.g., glass. The translucent or transparent element may constitute a major portion of the area of the door panel element. The area of the translucent or transparent element may be at least 50%, more preferably at least 60%, more preferably at least 70%, more preferably at least 80%, and more preferably at least 90% of the area of the door panel element.

The vertically extending sealing profile is connected to the door panel element. Preferably, the vertically extending sealing profile is connected to the door panel element at an end face of the door panel element. For example, the vertically extending sealing profile comprises a protrusion or an attachment base or foot insertable into a groove in the door panel element such that the vertically extending sealing profile and the door panel element are connected to each other. Similarly, the vertically extending sealing profile may be adhered or bolted to the door panel element. The vertically extending sealing profile may also be clipped on to and double-sided embrace the end face of the door panel element.

The vertically extending sealing profile may be formed at least in two pieces or be formed exactly in two pieces. A first portion of the vertically extending sealing profile may have a constant cross section. The first portion may be formed in one piece and/or the second portion may be formed in one piece. A second portion not having a constant cross section may be fitted over the first portion of the vertically extending sealing profile. The first portion may have a length (in the vertical direction) at least twice, preferably at least three times, more preferably at least four times, more preferably at least five times, more preferably at least seven times, and more preferably at least ten times larger than that of the first portion of the vertically extending sealing profile. That is, the first portion forms the essential part of the vertically extending sealing profile, wherein the second portion is preferably arranged in the upper area of the vertically extending sealing profile to thus form an upper termination of the vertically extending sealing profile. The first portion may be connected to the second portion, e.g., by clamping, snap-fitting, vulcanization, adhesion, or bolting.

The vertically extending sealing profile may be a safety edge (also denoted a safety molding). A safety edge may serve as an elastic profile for sealing between the door panel and another door panel or between the door panel and the portal. Alternatively or additionally, the safety edge may prevent clamping of objects, e.g., people or things, between the door panel and the portal or between two door panels or reduce a likelihood of clamping. Therefore, safety edges may, e.g., comprise an electrical contact bar generating a signal if the safety edge is deformed in a predefined manner. Alternatively or additionally, the safety edge may comprise a transceiver unit of a light grid arrangement.

The vertical sealing profile of the door panel has a lower height than the door panel element of the door panel. In other words, the extension of the vertical sealing profile in the gravitational direction (the vertical direction) is smaller than the extension of the door panel element in the gravitational direction (the vertical direction).

Preferably, the height of the door panel element is at least 0.5 m, more preferably at least 1.0 m, more preferably at least 1.5 m, more preferably at least 1.8 m, and more preferably at least 2.0 m.

The height of the vertical sealing profile is by at least 5 cm, preferably at least 7 cm, more preferably at least 10 cm, more preferably at least 12 cm, more preferably at least 15 cm, more preferably at least 17 cm, more preferably at least 20 cm, more preferably at least 22 cm, and more preferably at least 25 cm lower than the height of the door panel element.

A lower end of the vertical sealing profile may be arranged substantially (±10% or ±5%) at the same height as a lower end of the door panel element. In other words, a lower end of the vertical sealing profile may be substantially (±10% or ±5%) flush with the lower end of the door panel element.

An upper end of the vertical sealing profile may not be arranged at the same height as an upper end of the door panel element. In other words, an upper end of the vertical sealing profile may not be flush with the upper end of the door panel element.

An interval of at least 5 cm, preferably at least 7 cm, more preferably at least 10 cm, more preferably at least 12 cm, more preferably at least 15 cm, more preferably at least 17 cm, more preferably at least 20 cm, more preferably at least 22 cm, and more preferably at least 25 cm may exist between an upper end of the vertical sealing profile and an upper end of the door panel element.

An interval may exist between an upper end of the vertically extending sealing profile and a lower end of the horizontally extending sealing member. The interval may be a gap. The interval between the upper end of the vertically extending sealing profile and the lower end of the horizontally extending sealing member may be formed such that the vertically extending sealing profile does not overlap the horizontally extending sealing member. The interval between the upper end of the vertically extending sealing profile and the lower end of the horizontally extending sealing member may be at least 1 mm, preferably at least 2 mm, and more preferably at least 3 mm. Preferably, the interval is between 2 mm and 6 mm, more preferably between 3 mm and 5 mm, and more preferably about 4 mm.

Preferably, the height of the vertically extending sealing profile is at least 0.3 m, more preferably at least 0.8 m, more preferably at least 1.3 m, more preferably at least 1.5 m, more preferably at least 1.6 m, and more preferably at least 1.8 m.

The vertically extending sealing profile may comprise elastomer or rubber. The vertically extending sealing profile may consist of elastomer or rubber. For example, the vertically extending sealing profile comprises or consists of silicone or EPDM.

The vertically extending sealing profile may be manufactured or manufacturable by extrusion or co-extrusion.

The interior swing door may comprise a stop bracket. The horizontally extending sealing member may comprise a sealing lip. The sealing lip of the horizontally extending sealing member may abut the stop bracket.

The stop bracket may be a separate part, preferably inserted in the horizontally extending sealing member. To do so, the horizontally extending sealing member may comprise a recess inserted in the stop bracket. The stop bracket may be connected to the horizontally extending sealing member, e.g., by adhesion, snap-fit, scorching, clamping, or bolting.

The stop bracket may be a portion of the horizontally extending sealing member. In other words, the stop bracket may be formed integrally with the horizontally extending sealing member. The stop bracket may be an overmolded portion, attached, e.g., by injection molding or by vulcanization.

Preferably, the sealing lip of the horizontally extending sealing member abuts the stop bracket when the interior swing door is closed, i.e., when the interior swing door is in a closed state.

Alternatively or additionally, the sealing lip of the horizontally extending sealing member may abut the stop bracket when the interior swing door is opened, i.e., when the interior swing door is in an opened state.

Particularly preferable, the sealing lip of the horizontally extending sealing member abuts the stop bracket when the interior swing door is closed and when the interior swing door is opened, i.e., when the interior swing door is in a closed state and when the interior swing door is in an opened state. The sealing lip may additionally abut the stop bracket when the interior swing door transitions from the opened state to the closed state and/or from the closed state to the opened state.

The sealing lip of the horizontally extending sealing member may extend over the whole length of the horizontally extending sealing member in the horizontal direction and thus preferably cover the whole width of the door panel. Similarly, the sealing lip of the horizontally extending sealing member may have a smaller extension in the horizontal direction than the horizontally extending sealing member.

An extension of the stop bracket in the horizontal direction may be smaller than a horizontal extension of the horizontally extending sealing member and/or the sealing lip.

Preferably, the stop bracket has a width substantially corresponding to the width of the one or two vertical sealing profiles. The stop bracket may also be slightly wider than the one or two vertical sealing profiles.

The sealing lip may not overlap or cover the vertically extending sealing profile. In other words, the sealing lip may be spaced apart from the vertically extending sealing profile in the vertical direction, especially spaced apart such that an (air) gap between the sealing lip and the vertically extending sealing profile, especially its upper area, is formed.

The stop bracket may comprise an abutment area. In the closed state of the interior swing door, the sealing lip of the horizontally extending sealing member may abut the abutment area. Alternatively or additionally, the sealing lip of the horizontally extending sealing member may abut the abutment area in the opened state of the interior swing door. The sealing lip of the horizontally extending sealing member may abut the abutment area both, in the closed state of the interior swing door and the opened state of the interior swing door.

The abutment area may be formed planarly. The abutment area may extend over an area of at least 10 $cm^2$, preferably of at least 25 $cm^2$, more preferably of at least 50 $cm^2$, and more preferably of at least 100 $cm^2$.

The abutment area may extend over the whole length of the stop bracket in the horizontal direction. Alternatively, the abutment area may extend over a smaller length in the horizontal direction than the stop bracket.

The stop bracket may comprise a flexible portion. The flexible portion may follow the abutment area and protrude downwards, especially in the direction of the vertically extending sealing profile. In the closed state of the interior swing door, the vertically extending sealing profile, especially an upper area of the vertically extending sealing profile, may abut the flexible portion.

Preferably, the vertically extending sealing profile does not abut the flexible portion when the interior swing door is opened, i.e., when the interior swing door exists in the opened state.

In a case where the vertically extending sealing profile abuts the flexible portion of the stop bracket, the flexible portion may be elastically deformed or compressed. Thereby, sealing of the interior may be improved.

The stop bracket may be inserted between a left and right area of the horizontally extending sealing member. "Left" and/or "right" may extend in a direction perpendicular to the gravitational direction. "Left" and/or "right" may extend in the horizontal direction.

Preferably, the stop bracket is arranged substantially (±10% or ±5%) centered in relation to the horizontal extension of the horizontally extending sealing member. In this case, the left and right area of the horizontally extending sealing member may exhibit substantially (±10% or ±5%) the same length in the horizontal direction.

Especially in a single-leaf interior swing door, the stop bracket may be arranged, e.g., inserted, in or on an edge area of the horizontally extending sealing member. An interval between the stop bracket and an edge or end of the horizontally extending sealing member may be smaller than 30 cm, preferably smaller than 20 cm, more preferably smaller than 10 cm, and more preferably smaller than 5 cm.

The stop bracket may comprise a water guide structure. The water guide structure may extend substantially (±10% or ±5%) horizontally. The water guide structure may be configured to collect and laterally drain entering water from the stop bracket, e.g., by a slight slope.

Water (e.g. rainwater) may be collected in the water guide structure. To do so, the stop bracket may comprise an area comprising an indentation. Lateral ends, i.e., ends in the horizontal direction of the stop bracket may be formed to drain water from the indentation of the stop bracket. For example, at least one lateral end may comprise an opening, preferably, both lateral ends of the water guide structure each comprise an opening. The water guide structure may be formed as a gutter or gutter-like.

The water guide structure may be formed in the flexible portion of the stop block. The flexible portion may follow the abutment area and especially protrude downwards. Thus, the water guide structure lies below the construction of the sealing lip and may collect water draining on the sealing lip of the horizontal sealing member.

The stop bracket may comprise at least one lateral seal member. The lateral seal member may be at least partly compressed or deformed when the interior swing door is closed. Preferably, the stop bracket comprises two lateral seal members, each lateral seal member arranged on a lateral end (in the horizontal direction) of the stop bracket. In the closed state of the interior swing door, both lateral seal members may be compressed or deformed. The compression or deformation of one or both lateral seal members may be elastic.

Preferably, the lateral seal member or the lateral seal members are not compressed or deformed when the interior swing door is opened.

In a case where the interior swing door is closed, a section of the door panel, especially of the door panel element, may abut and deform or compress the lateral seal member. If the interior swing door comprises two door panels, a portion of each door panel may respectively abut and deform or compress a lateral seal member.

The stop bracket may comprise plastic or consist of plastic. The stop bracket may consist of the same material as the horizontally extending sealing member. Similarly, the stop bracket may consist of plastic that is harder than the horizontally extending sealing member.

The stop bracket may be manufactured as an injection molding part or by 3D printing (additive manufacturing).

The vertically extending sealing profile may comprise a water introduction structure. Preferably, the vertically extending sealing profile comprises the water introduction structure in the upper area.

The water introduction structure may comprise an opening. Through the opening, water may be introduced to the vertically extending sealing profile. The vertically extending sealing profile may comprise a channel through which the water may flow out at the bottom of the vertically extending sealing profile. The water introduction structure may comprise an indentation. The opening may be formed at the bottom of the indentation. The indentation may be formed in a funnel shape. The water introduction structure may be part of the second portion of the vertically extending sealing profile.

The door panel element may comprise glass. At least 50% by weight of the door panel element may consist of glass.

Preferably, at least 60% by weight, and more preferably, at least 70% by weight the door panel element consists of glass.

The door panel may be coupled to a door panel drive. By the door panel drive, opening and/or closing the interior swing door may be feasible. The door panel drive may comprise a motor, especially an electric motor. Similarly, the door panel drive may comprise a pneumatic or hydraulic drive member.

The interior swing door may be opened and/or closed automatically, preferably semi-automatically or fully-automatically.

The described door panel may be a first door panel. The described door panel element may be a first door panel element. The described vertically extending sealing profile may be a first vertically extending sealing profile. The interior swing door may comprise a second door panel with a second door panel element and a second vertically extending sealing profile. The second door panel may be any door panel disclosed herein. The second door panel element may be any door panel element disclosed herein. The second vertically extending sealing profile may be each any extending sealing profile disclosed herein.

Preferably, the interior swing door is a double-leaf interior swing door.

Disclosed is a vehicle with an interior swing door. The interior swing door may be any interior swing door disclosed herein. Preferably, the vehicle is a utility vehicle or a passenger vehicle. The vehicle may be a truck, a bus, or a train. Particularly preferable, the vehicle is a bus.

The vehicle may be an elevator or a nacelle, e.g. a cable car nacelle. The vehicle may be an autonomous vehicle.

BRIEF DESCRIPTION OF THE DRAWINGS

In the following, the disclosure and other embodiments and advantages of the disclosure, respectively, will be explained in detail based on figures, the figures only describing exemplary embodiments of the disclosure. Identical components in the figures are denoted by identical reference signs. In the figures.

DETAILED DESCRIPTION

Figure 1:
FIG. 1 shows a conventional sealing member.

FIG. 1 shows a cutout of a conventional interior swing door 100*p*. The interior swing door 100*p* comprises a horizontally extending sealing member 160*p*. Further, the interior swing door 100*p* comprises two door panels with two vertically extending sealing profiles each (not shown in FIG. 1). When opening the interior swing door 100*p*, the door panels carry out a swinging motion. In this motion, one portion of the door panels, respectively, protrudes beyond a plane defined by the door panels when the interior swing door 100*p* is closed. By the projection of the portions of the door panels, a portion of the vertically extending sealing profiles, respectively, contacts the horizontally extending sealing member 160*p*.

In daily use, the interior swing door 100*p*, especially on busses, opens and closes frequently. Through the repeated contacting and friction between the vertically extending sealing profiles and the horizontally extending sealing member, the horizontal sealing member and/or the vertically extending sealing profiles wear out relatively quickly.

In FIG. 1, a bulge 161*p* is recognizable, which is caused by the repeated opening and closing of the interior swing door 100*p*. The bulge 161*p* is undesired and leads to wear, requiring frequent replacement of the horizontally extending sealing member 160*p* and degrading the seal between the door panels and the horizontally extending sealing member, respectively, which may lead to water ingress or to air intake and loud driving noises.

Figure 2:
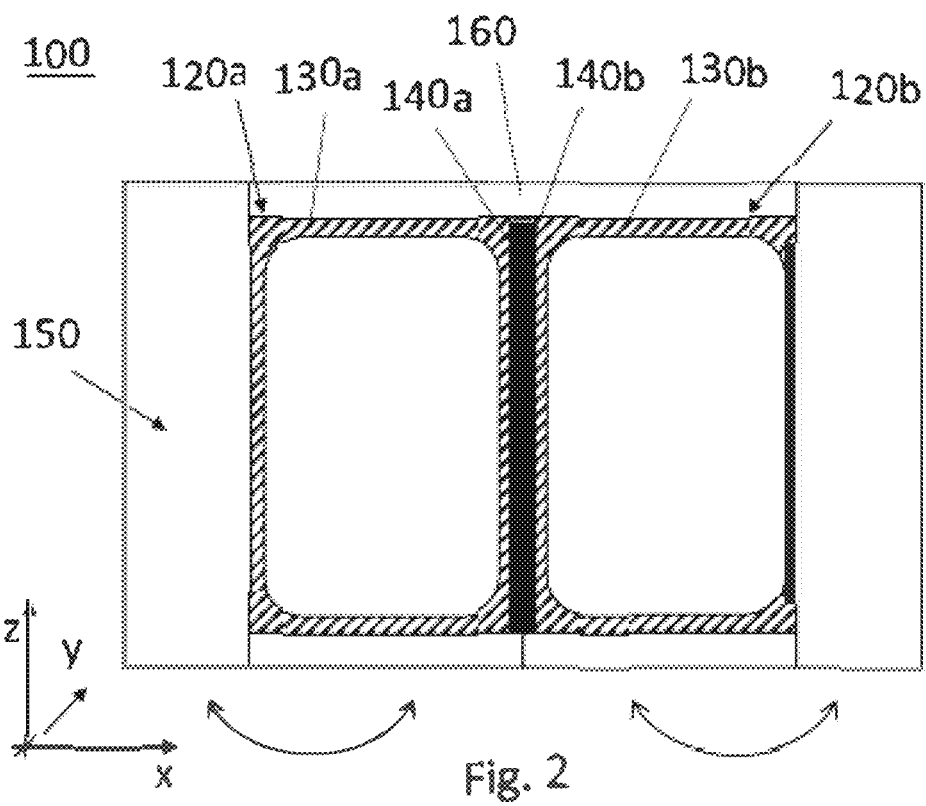
FIG. 2 shows an interior swing door in the closed state, according to embodiments.

FIG. 2 schematically shows an interior swing door 100. The interior swing door 100 is depicted as a double-leaf interior swing door and is described in the following as such, however, the disclosure is not limited to a double-leaf interior swing door, rather, the description of the double-leaf interior swing door analogously applies to a single-leaf interior swing door.

The interior swing door 100 comprises a first door panel 120*a* and a portal 150. Further, the interior swing door 100 may comprise a second door panel 120*b*. The portal 150 is, e.g., formed as a metal frame and/or attached to the vehicle chassis. The portal comprises, amongst others, a horizontally extending sealing member 160 in the upper area of the portal. The horizontally extending sealing member 160 protrudes in the vertical direction (in the gravitational direction) beyond an upper end of the first and/or second door panels 120*a*, 120*b*. In other words, the horizontally extending sealing member 160 overlies or covers an upper portion of the first and/or second door panel 120*a*, 120*b*.

In the portal, the first and/or the second door panels 120*a*, 120*b* may be supported for being able to execute a swinging motion (indicated by the bent double arrows).

The first door panel 120*a* comprises a first door panel element 130*a* and a first vertically extending sealing profile 140*a*. The door panel element 130*a* may comprise a translucent or transparent element, e.g. glass. The translucent or transparent element may make up a major portion (more than 50%) of the area of the first door panel element 130*a*. The door panel element 130*a* may comprise a frame. In the frame, the translucent or transparent element may be held. The vertically extending sealing profile 140*a* may be mounted at an end face of the door panel element 130*a*. The vertically extending sealing profile 140*a* has a lower height than the door panel element 130*a*.

The second door panel 120*b* may be configured analogously to the first door panel 120*a*. The second door panel 120*b* comprises a second door panel element 130*b* and a second vertically extending sealing profile 140*b*.

In FIG. 2, the interior swing door 100 is closed. In this state, the first vertical sealing profile 140*a* contacts the second vertical sealing profile 140*b*. In a case where the interior swing door 100 is single leaf, that is, comprises only one door panel 120*a*, the vertically extending sealing profile 140*a* may contact the portal 150 when the interior swing door 100 is closed.

Figure 3:
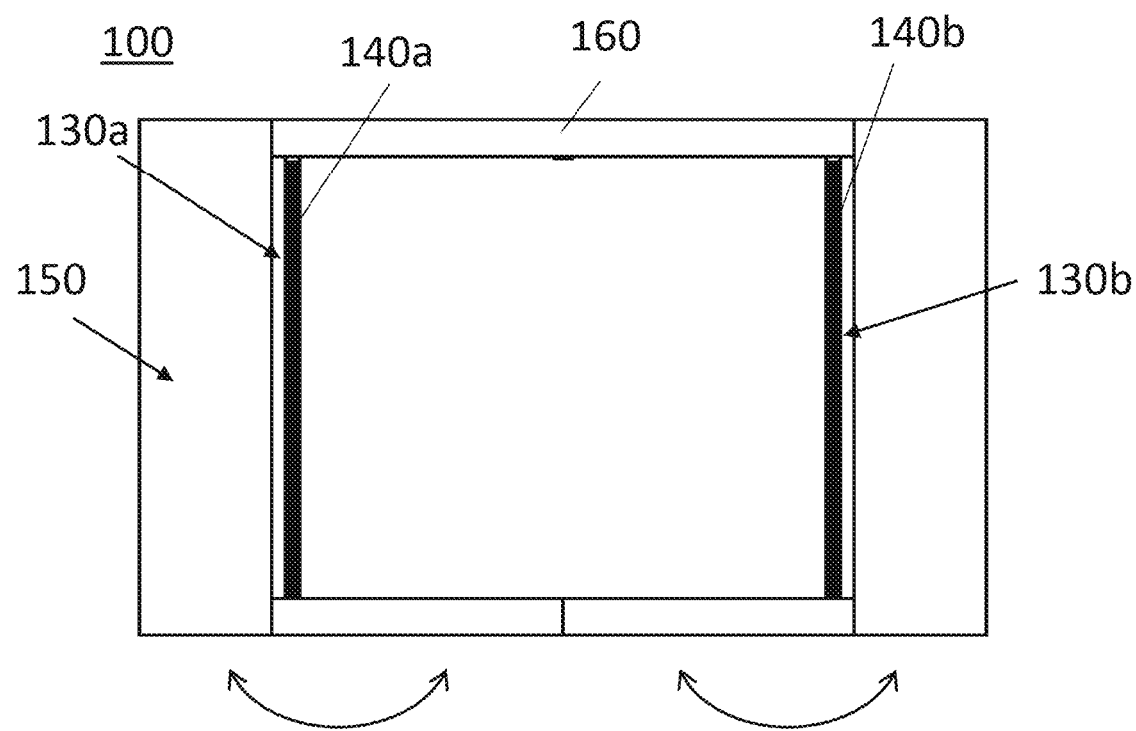
FIG. 3 shows an interior swing door in the opened state, according to embodiments.

FIG. 3 shows the interior swing door 100 in the opened state. The first door panel 120*a* and the second door panel 120*b* have conducted a swinging motion, so that a major portion of the first door panel 120*a* and of the second door panel 120*b* protrude into an interior. With a view to FIG. 3, the interior is understood here as a space lying behind the portal 150.

Figure 6:
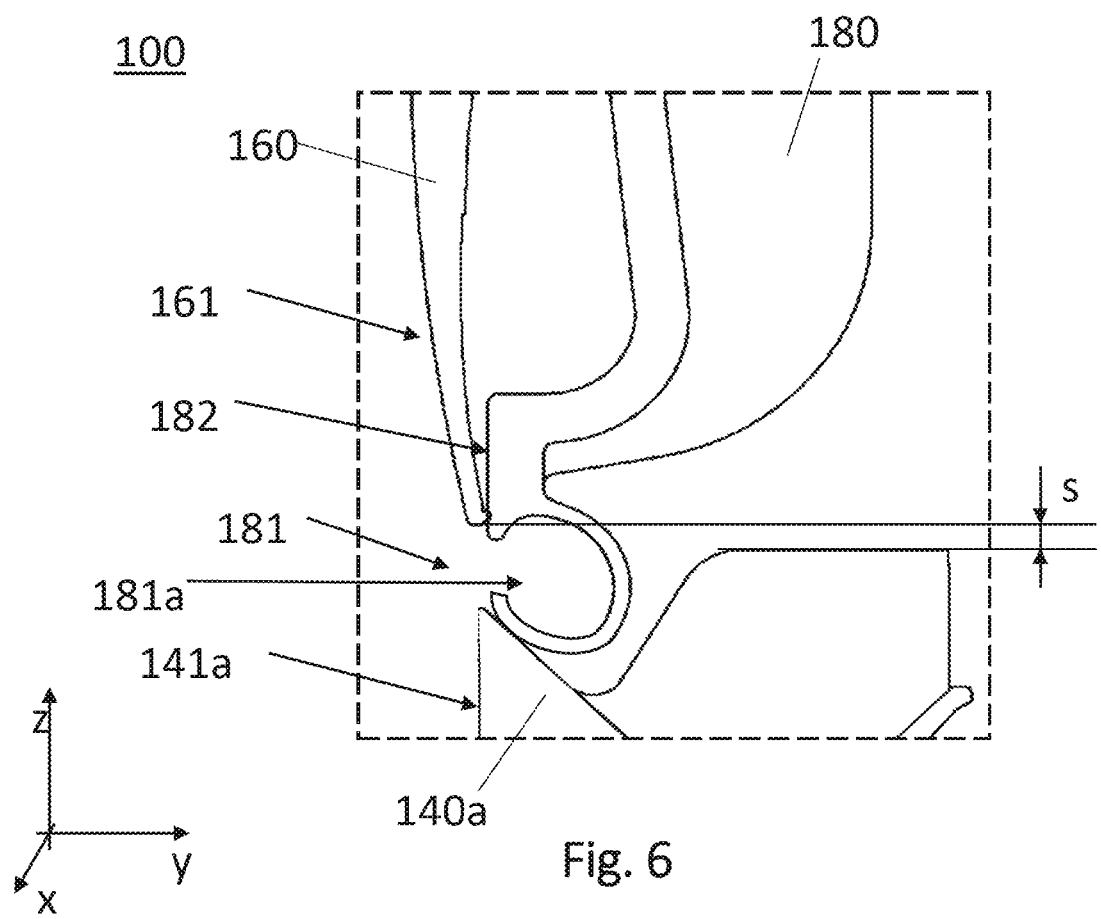
FIG. 6 shows a sectional view with a stop bracket, according to embodiments.
Figure 12:
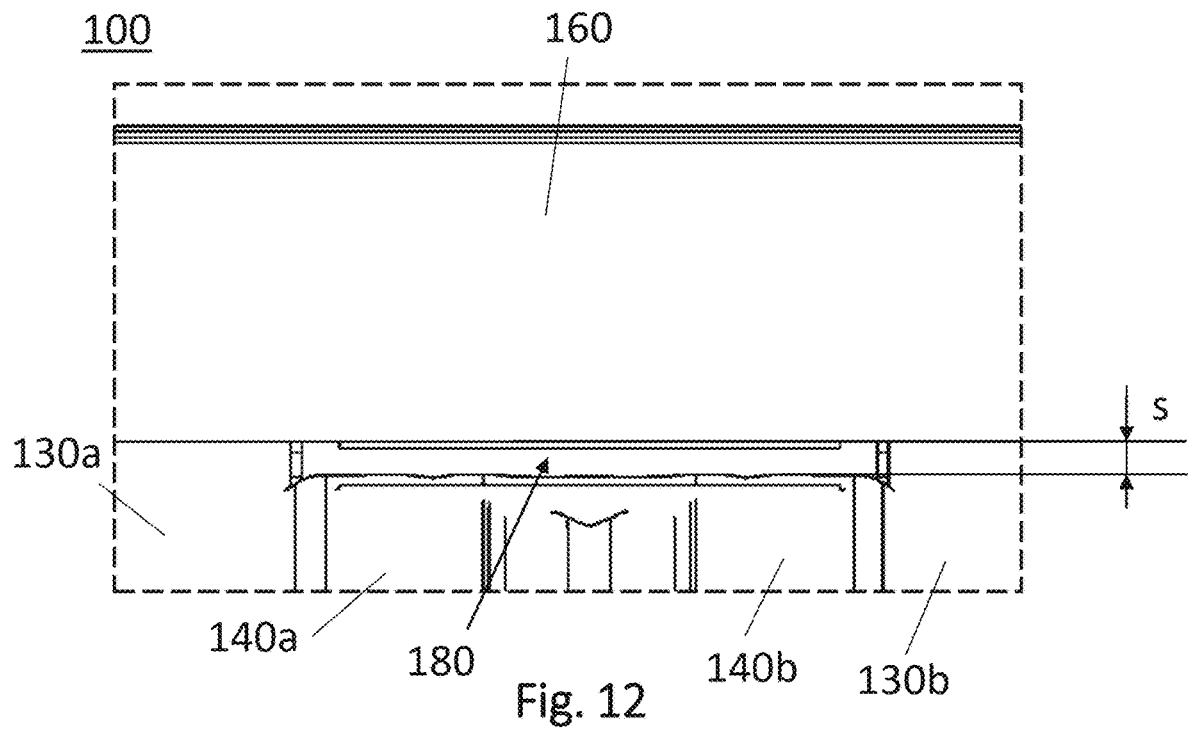
FIG. 12 shows a cutout of an interior swing door in the closed state in a front view, according to embodiments.

As indicated in FIGS. 2 and 3, an interval s exists between the upper end of the first vertically extending sealing profile 140*a* and a lower end of the horizontally extending sealing member 160 (see FIGS. 6 and 12). The interval s leads to a gap between the first vertically extending sealing profile 140*a* and the horizontally extending sealing member 160. In a case where the interior swing door 100 opens, the first vertically extending sealing profile 140*a* may travel underneath the horizontally extending sealing member 160 without contacting the horizontally extending sealing member 160. In this course, a portion of the vertically extending sealing profile 140*a* may penetrate or protrude through a plane or area defined by at least the first door panel 120*a* in the closed state of the interior swing door 100. Analogously, this is valid for the second door panel 120*b*. The interval s preferably amounts to 2-6 mm.

Figure 4:
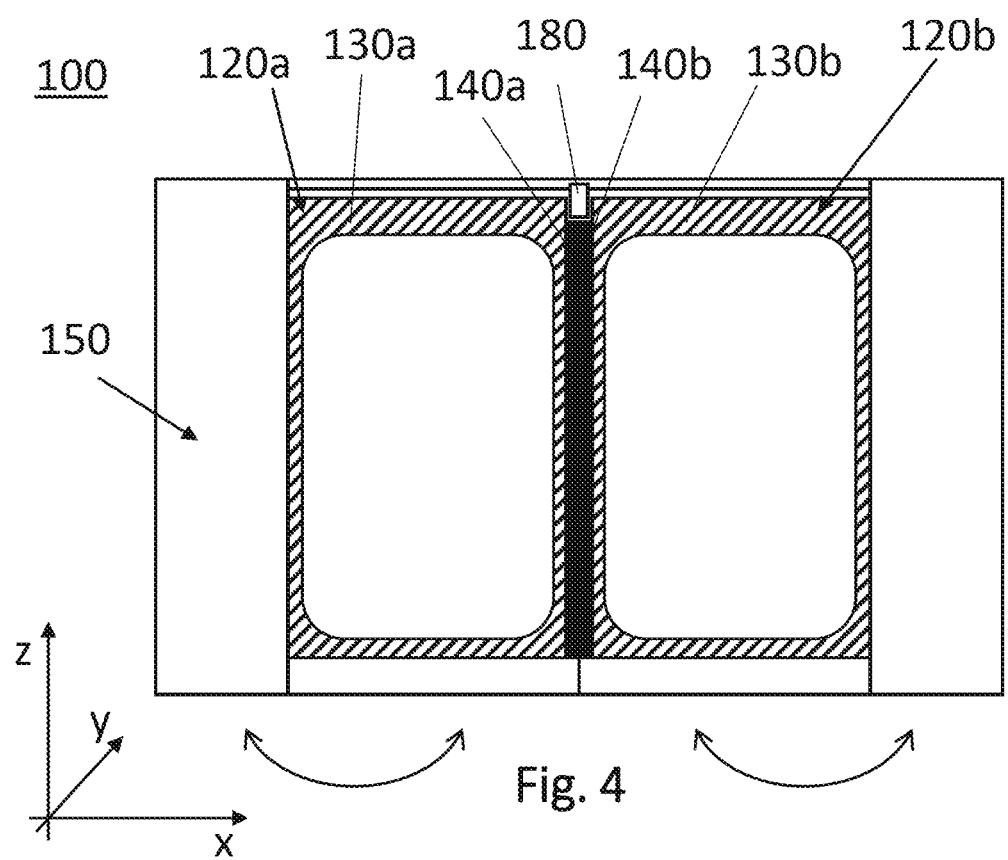
FIG. 4 shows an interior swing door in the closed state, according to embodiments.

In FIG. 4, an interior swing door 100 is depicted as it is in FIG. 2, that is in a closed state, wherein the horizontally extending sealing member 160 is not depicted in FIG. 4.

Figure 5:
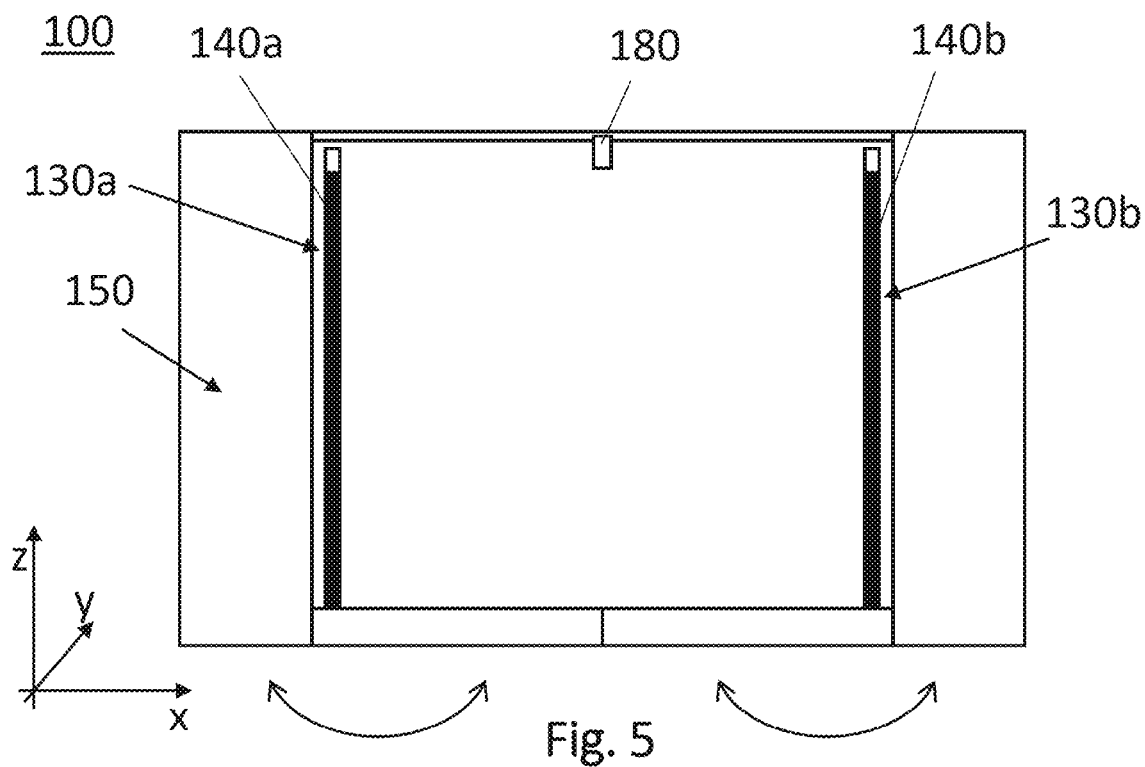
FIG. 5 shows an interior swing door in the opened state, according to embodiments.

In FIG. 5, the interior swing door 100 is depicted as it is in FIG. 3, i.e., in an opened state, wherein the horizontally extending sealing member 160 is not depicted in FIG. 5.

The interior swing door 100 may comprise a stop bracket 180. The stop bracket 180 may be largely concealed or overlayed by the horizontally extending sealing member 160 (see FIGS. 2 and 3). In order to make the stop bracket 180 in FIGS. 4 and 5 visible, parts of the horizontally extending sealing member 160 are not depicted.

The stop bracket 180 may be inserted in the horizontally extending sealing member 160. For example, the horizontally extending sealing member 160 may comprise a recess inserted into the stop bracket 180. Similarly, the stop bracket 180 may be made in one piece with the horizontally extending sealing member 160. The stop bracket 180 may consist of the same material as that of the horizontally extending sealing member 160.

The stop bracket 180 may be arranged or formed substantially (±10% or ±5%) centered in the horizontally extending sealing member 160. Here, centered refers to the extension of the horizontally extending sealing member 160 in the horizontal direction. In a case where the interior swing door 100 is a single-leaf interior swing door, the stop bracket 180 may be arranged or formed in an edge area of the horizontally extending sealing member 160, i.e., in the area, in which the vertically extending sealing profile is located.

FIG. 6 shows a cutout of a sectional view of the interior swing door 100. In the cutout, a portion of the stop bracket 180, a portion of the horizontally extending sealing profile 160, and a portion of the vertically extending sealing profile 140*a* are depicted.

The horizontally extending sealing profile 160 may comprise a sealing lip 161. The sealing lip 161 may protrude downwards (in the gravitational direction). With increasing downwards extension, the thickness of the sealing lip 161 may decrease. The sealing lip 161 may be bent towards the inside fully or at least in sections. Especially, the sealing lip 161 is bent in the direction of the stop bracket 180. The sealing lip 161 may extend, at least in sections, over an area or plane defined by the door panel 120*a* and/or the door panel 120*b* in the closed state of the interior swing door 100.

The stop bracket 180 may comprise an abutment area 182. The abutment area 182 may be a planar portion of the stop bracket 180. The abutment area 182 and the sealing lip 161 of the horizontally extending sealing profile 160 may be positioned towards each other such that the sealing lip 161 abuts the abutment area 182. The sealing lip 161 may abut the abutment area 182 in the opened and/or in the closed state of the interior swing door 100. Preferably, the sealing lip 161 may abut the abutment area 182 when the interior swing door 100 transitions from the opened state to the closed state and/or when the interior swing door 100 transitions from the closed state to the opened state. Particularly preferable, the sealing lip 161 abuts the abutment area 182 regardless of the opening and closing state of the interior swing door 100.

The stop bracket 180 may comprise a flexible section 181. The flexible section 181 may follow the abutment area 182, especially follow it downwards. The flexible section 181 may protrude downwards (in the gravitational direction). The flexible section 181 may be elastic. Especially, at least one portion of the flexible section 181 protrudes beyond or through an area or plane defined by the first door panel 120*a* or the second door panel 120*b* in the closed state of the door, when the flexible section 181 is unloaded.

The first vertically extending sealing profile 140*a* may comprise an upper area 141*a*. In the closed state of the interior swing door 100, the upper area 141*a* may abut the flexible section 181. By the upper area 141*a* of the first vertically extending sealing profile 140*a*, the flexible section 181 may be deformed or compressed, especially deformed or compressed elastically.

In FIG. 6, the flexible section 181 is shown in a non-deformed or non-compressed state. In a case where the flexible section 181 is deformed or compressed, it is pushed in the direction of the interior.

The stop bracket 180 may comprise a water guide structure 181*a*. The water guide structure 181*a* may be opened against an exterior. The exterior may be located on the side of the first door panel 120*a* and/or of the second door panel 120*b* opposite the interior. The water guide structure 181*a* may be formed to include water. For example, rainwater may be receivable by the water guide structure 181*a*. The water guide structure 181*a* may comprise an indentation in which the water may be stored at least temporarily. The water guide structure 181*a* may be formed in the shape of a gutter.

Preferably, an opening is formed on at least one end of the water guide structure 181*a* (in the horizontal direction). Through the opening, water may be drained from the water guide structure 181*a*. Particularly preferable, the water guide structure 181*a* comprises an opening at each of both ends (in the horizontal direction).

Figure 7:
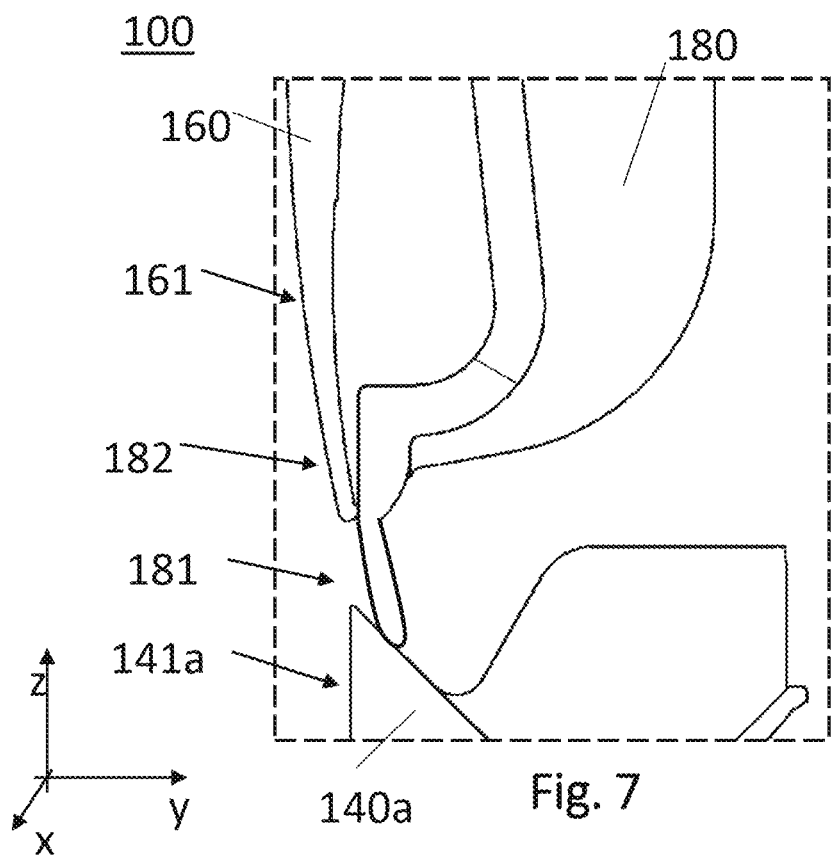
FIG. 7 shows a sectional view with a stop bracket, according to embodiments.

FIG. 7 shows an illustration similar to that of FIG. 6. The interior swing door 100 comprises the horizontally extending sealing profile 160 with a sealing lip 161, the stop bracket 180 with an abutment area 182 and a flexible section 181, and the first vertically extending sealing profile 140*a* with an upper area 141*a*.

In this embodiment of the stop bracket 180, the flexible area 181 is realized as a lip or a rib. The flexible area 181 may extend substantially (±10% or ±5%) linearly downwards when the flexible area 181 is unloaded. Preferably, the stop bracket 180 of this embodiment comprises no water guide structure 181*a*.

Figure 8:
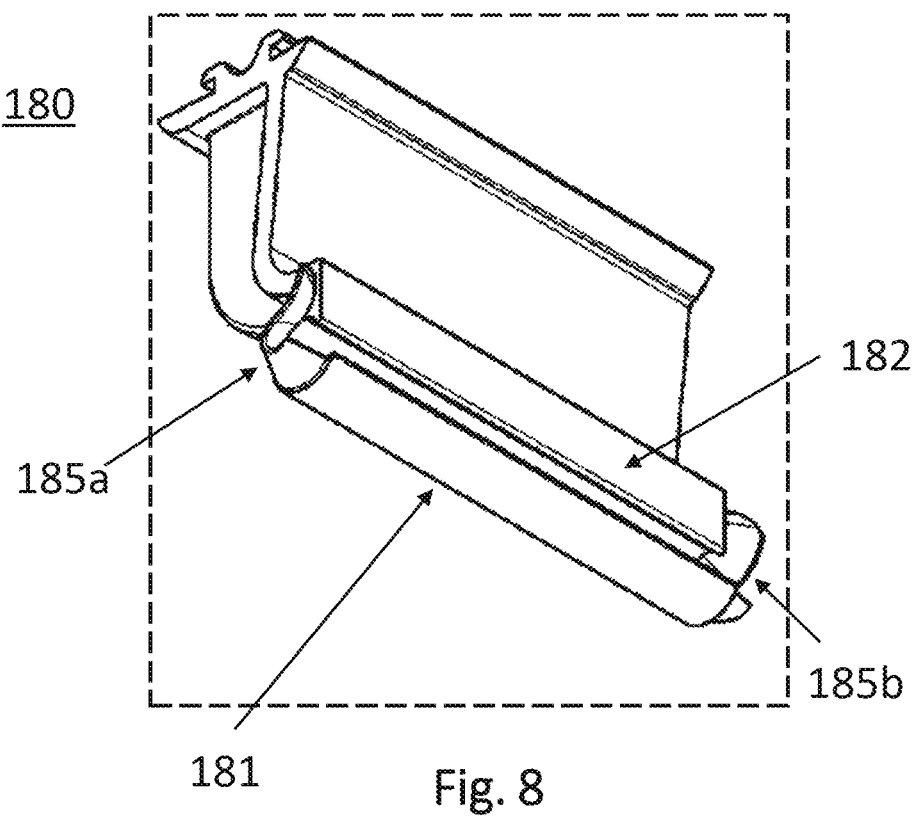
FIG. 8 shows a perspective view of a stop bracket, according to embodiments.

FIG. 8 shows the stop bracket 180 in a perspective view. The stop bracket 180 may comprise a first lateral seal member 185*a*. The first lateral seal member 185*a* may be formed at a first end of the flexible section 181. The first end may be an end in the horizontal direction. The stop bracket 180 may comprise a second lateral seal member 185*b*. The second lateral seal member 185*b* may be formed at a second end of the flexible section 181. The first end may be an end in the horizontal direction.

A portion of the first door panel 120*a* (or an edge of the vertical sealing profile 140*a*) may abut the first lateral seal member 185*a* when the interior swing door 100 is closed. A portion of the second door panel 120*b* (or an edge of the vertical sealing profile 140*b*) may abut the second lateral seal member 185*b* when the interior swing door 100 is closed.

The first lateral seal member 185*a* may protrude (in the horizontal direction) from the stop bracket 180 when the first lateral seal member 185*a* is unloaded. By the abutment of the portion of the first door panel 120*a*, the first lateral seal member 185*a* may be compressed or deformed. The second lateral seal member 185*b* may protrude (in the horizontal direction) from the stop bracket 180 when the second lateral seal member 185*b* is unloaded. By the abutment of the portion of the second door panel 120*b*, the second lateral seal member 185*b* may be compressed or deformed.

The first lateral seal member 185*a* and/or the second lateral seal member 185*b* may be formed in one piece with the stop bracket 180. Especially, the first lateral seal member 185*a* and/or the second lateral seal member 185*b* consist of the same material as the stop bracket 180.

The first lateral seal member 185*a* and/or the second lateral seal member 185*b* may be formed as a portion of a cone.

Figure 9:
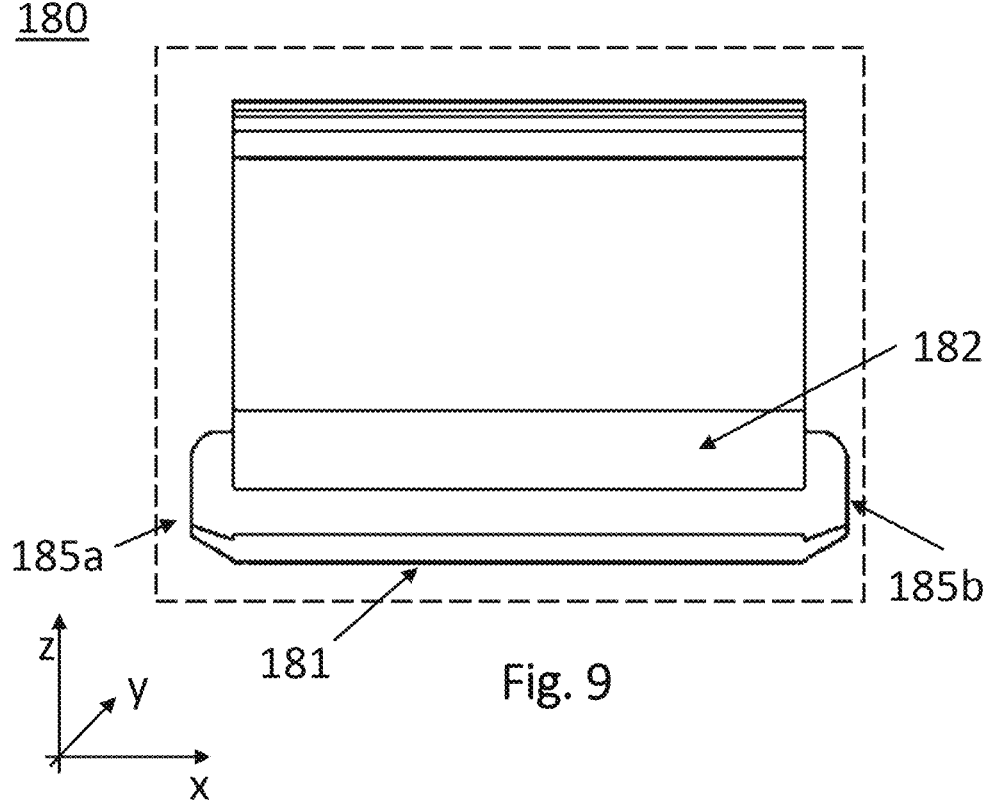
FIG. 9 shows a front view of a stop bracket, according to embodiments.

In FIG. 9, the stop bracket 180 is shown in a front view. The stop bracket 180 may comprise an abutment area 182. In the vertical direction, a flexible section 181 may follow the abutment area 182. It is also possible that a part of the abutment area 182 is flexible already and easily gives in when abutting an upper end of the vertical sealing profile. A first lateral seal member 185*a* may be formed in the horizontal direction at the stop bracket 180, especially formed at the flexible section 181 of the stop bracket 180. A second lateral seal member 185*b* may be formed in the horizontal direction at the stop bracket 180, especially at the flexible section 181 of the stop bracket 180.

Figure 10:
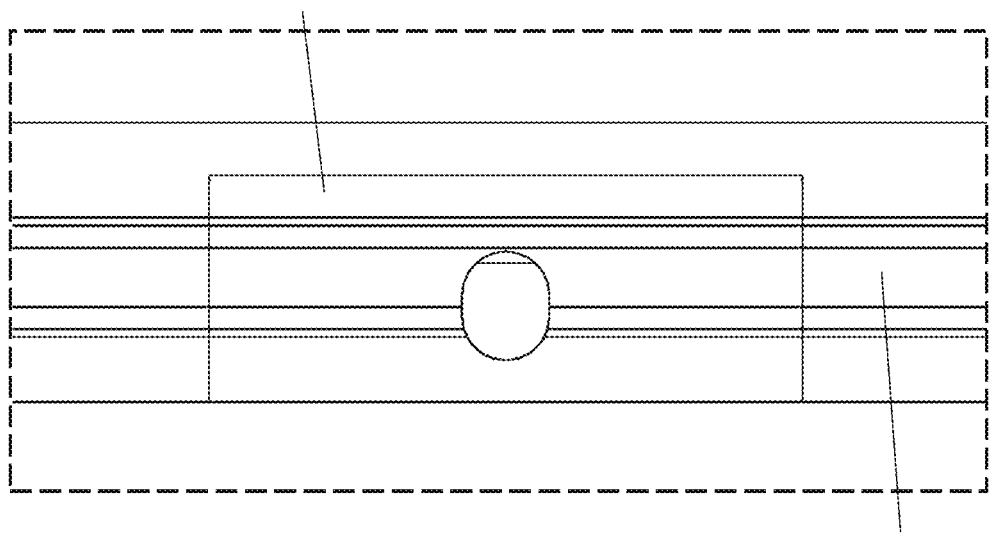
FIG. 10 shows a top view of a stop bracket in the horizontally extending sealing member, according to embodiments.

FIG. 10 shows the horizontally extending sealing member 160 and the stop bracket 180 in a top view from above, i.e., in a vertical direction. The stop bracket 180 may be formed in one piece with the horizontally extending sealing member 160. The abutment bracket 180 may consist of the same material as that of the horizontally extending sealing member 160.

Alternatively, the stop bracket 180 and the horizontally extending sealing member 160 may be formed as separate elements. The horizontally extending sealing member 160 may comprise a recess. In the recess, the stop bracket 180 may be inserted. The stop bracket 180 may be connected to the horizontally extending sealing member 160. The connection may be configured by clamping, snap-fitting, adhesion, vulcanization or bolting.

Figure 11:
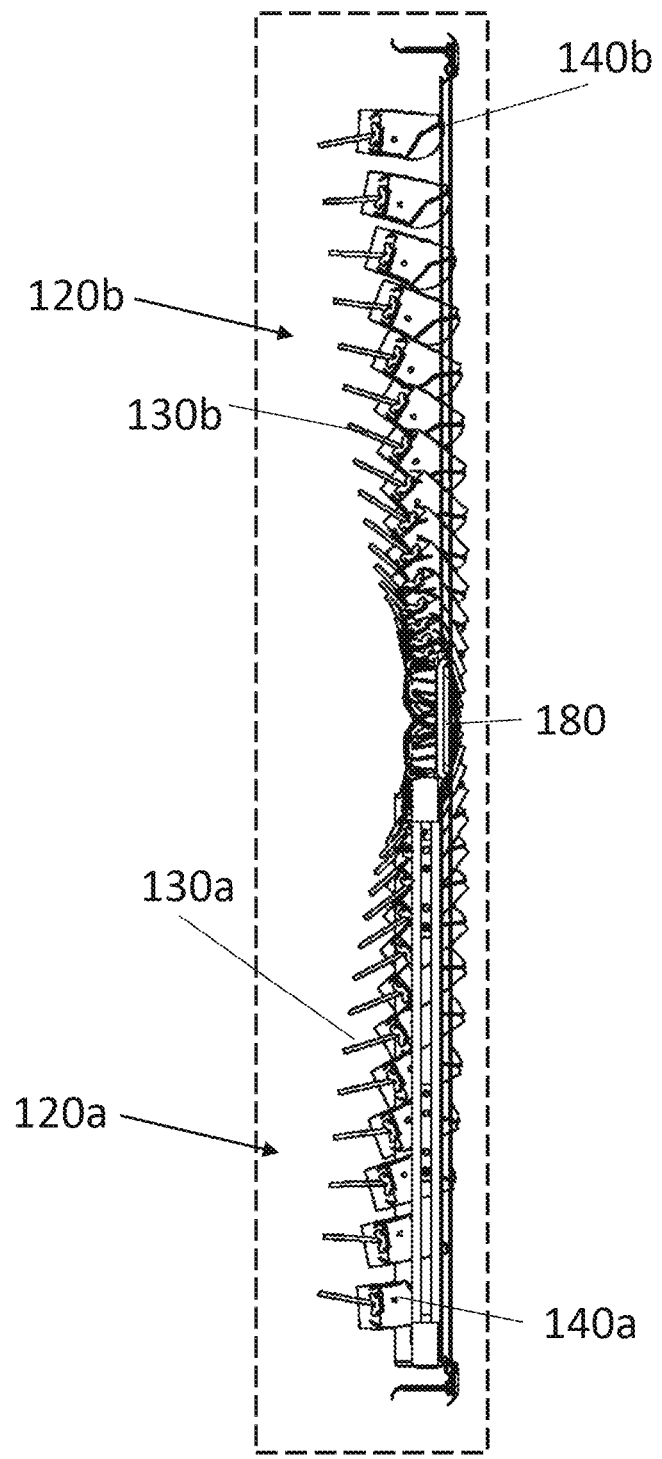
FIG. 11 shows positions of the first door panel and the second door panel at different points in time during a closing or opening process of the interior swing door, according to embodiments.

FIG. 11 shows positions of the first door panel 120*a* and of the second door panel 120*b* at different points in time during a closing or opening process of the interior swing door 100.

The position of the first door panel 120*a* at the outermost end (in FIG. 11 at the bottom) and the position of the second door panel 120*b* at the outermost end (in FIG. 11 at the top) describe the positions of the first door panel 120*a* and the second door panel 120*b* when the interior swing door 100 is fully opened. The position of the first door panel 120*a* in the centered position (in FIG. 11 in the center) and the position of the second door panel 120*b* in the centered position (in FIG. 11 in the center) describe the positions of the first door panel 120*a* and the second door panel 120*b* when the interior swing door 100 is fully closed. Intermediate positions of the first door panel 120*a* and the second door panel 120*b* describe positions of the first door panel 120*a* and the second door panel 120*b* when the interior swing door 100 transitions between the fully opened and the fully closed states.

As can be seen in FIG. 11, the first door panel 120*a* and/or the second door panel 120*b* define an area or plane when the interior swing door 100 exists in the closed state. During the opening and/or during the closing of the interior swing door 100, a portion of the first door panel 120*a* and/or a portion of the second door panel 120*b* protrudes through the area or plane or beyond the area or plane. By the configuration of the first and/or second vertically extending sealing profiles 140*a*, 140*b*, no contact occurs between the first and/or second vertically extending sealing profiles 140, 140*b* and the horizontally extending sealing member 160.

FIG. 12 shows a cutout of an interior swing door 100 in the closed state in a front view. An interval s may be formed between the horizontally extending sealing member 160 and the first and/or second vertically extending sealing profile 140*a*, 140*b*. The interval s may be formed in the vertical direction such that a gap exists between the horizontally extending sealing member 160 and the first and/or second vertically extending sealing profiles 140*a*, 140*b*. The stop bracket 180, especially the flexible section 181 of the stop bracket 180, may abut an upper portion of the first and/or second vertically extending sealing profiles 140*a*, 140*b*. Thereby, the gap between the horizontally extending sealing member 160 and the first and/or second vertically extending sealing profiles 140*a*, 140*b* may be sealed.

Figure 13:
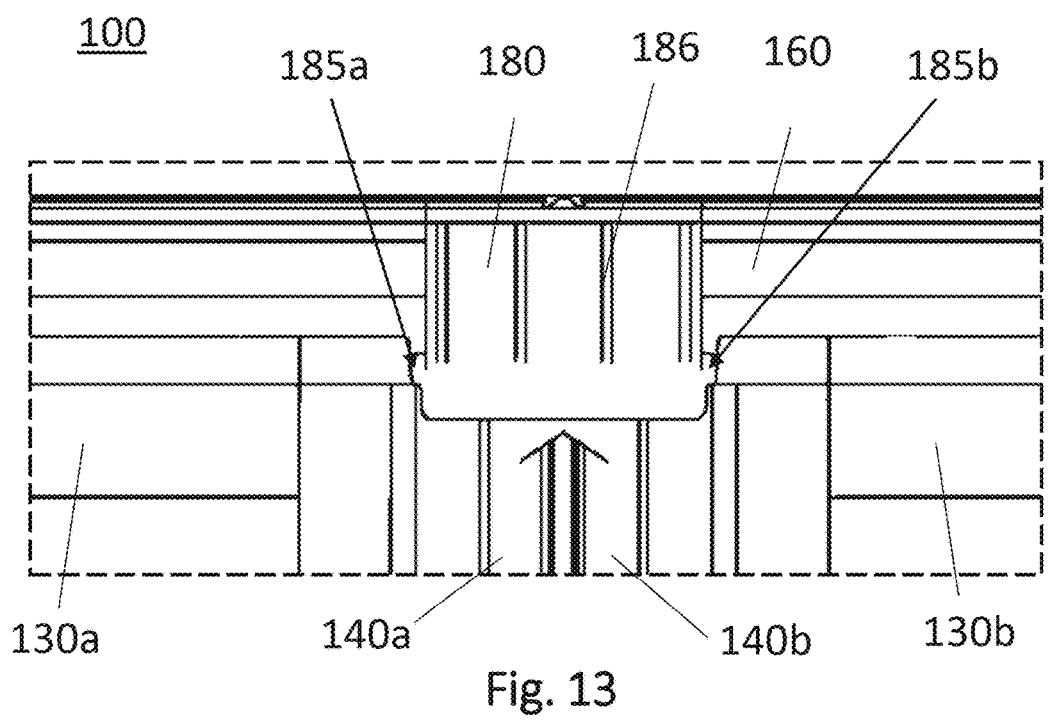
FIG. 13 shows a cutout of an interior swing door in the closed state in a rear view, according to embodiments.

FIG. 13 shows a cutout of an interior swing door 100 in the closed state in a rear view, i.e., from the inside. The stop bracket 180 may comprise at least one rib 186, preferably at least two or more ribs. The at least one rib 186 may substantially (±10% or ±5%) extend in the vertical direction. The at least one rib 186 may be formed on a side of the stop bracket 180 facing in the direction of the interior. The at least one rib 186 may be formed on a side of the abutment area 182 opposite to the stop bracket 180. The one or more ribs 186 are for stability of the stop bracket 180.

The first lateral seal member 185*a*, in the closed state of the interior swing door 100, may abut a portion of the first door panel 120*a*. The second lateral seal member 185*b*, in the closed state of the interior swing door 100, may abut a portion of the second door panel 120*b*. Thereby, the seal of the interior, when the interior swing door 120*a* closed, may be improved.

Figure 14:
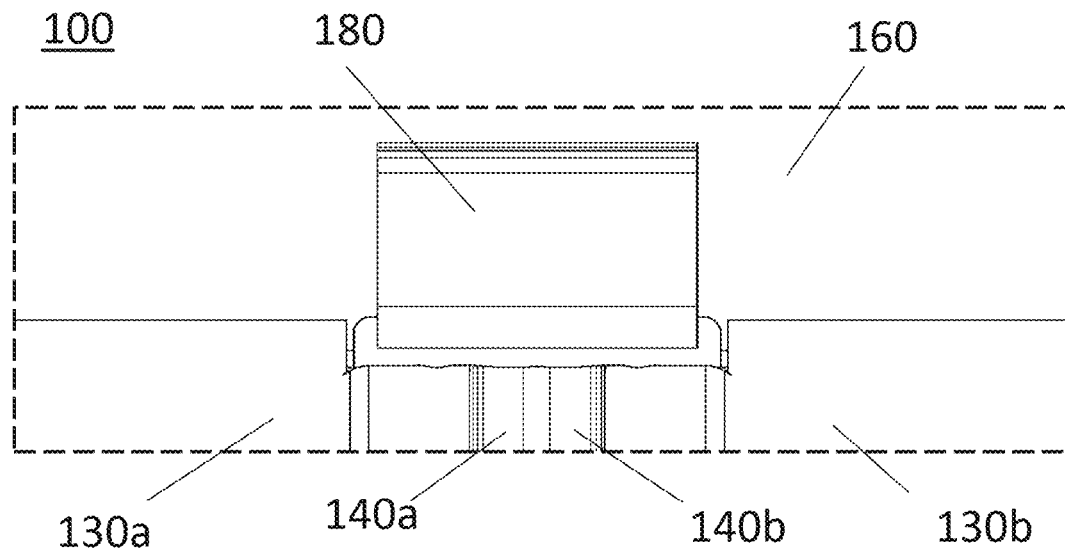
FIG. 14 shows a cutout of an interior swing door in the closed state in a front view, according to embodiments.

FIG. 14 shows a cutout of an interior swing door 100 in the closed state in a front view. The depiction of FIG. 14 is similar to the depiction of FIG. 12, wherein, compared with FIG. 12, a part of the horizontally extending sealing member 160 is not depicted.

Figure 15:
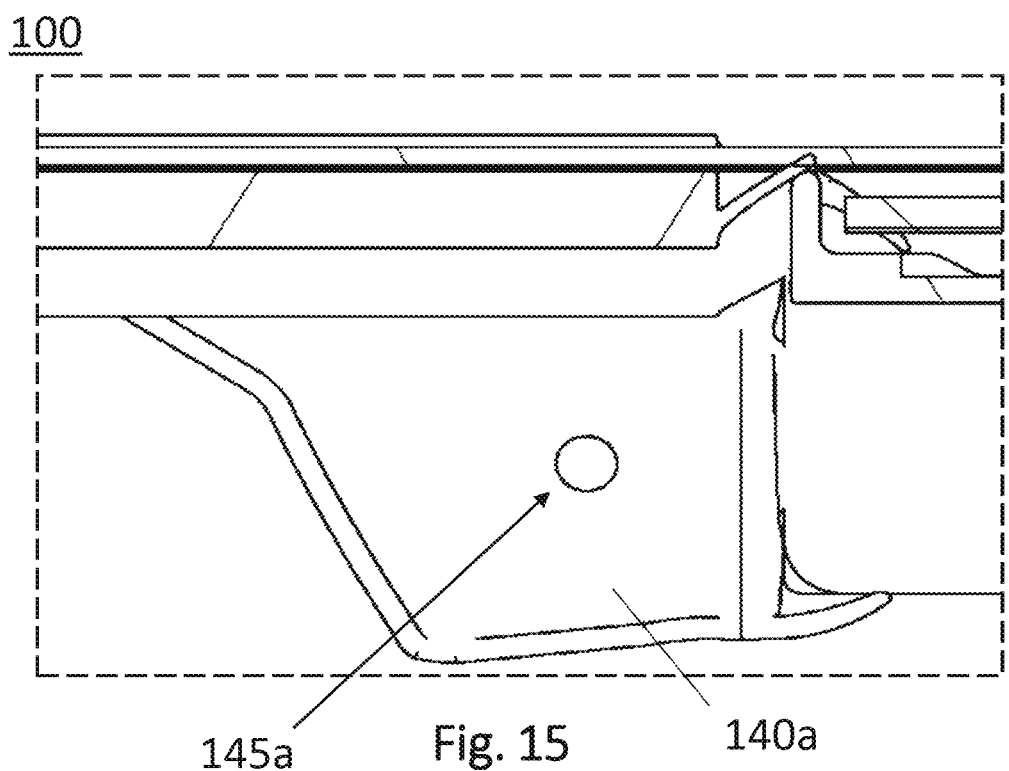
FIG. 15 shows a cutout of an interior swing door in a top view, according to embodiments.

FIG. 15 shows a cutout of an interior swing door 100 in a top view. In an upper area (against the gravitational direction) of the first vertically extending sealing profile 140*a*, an indentation may be formed. The indentation may be configured in a tub shape or a funnel shape. In the upper area of the first vertically extending sealing profile 140*a*, a water introduction structure 145*a* may be formed. The water introduction structure 145*a* may be an opening. The water introduction structure 145*a* may be an input to a channel in the first vertically extending sealing profile 140*a*. The channel may extend, at least in sections and especially completely, through the first vertically extending sealing profile 140*a*.

In the upper area of the first vertically extending sealing profile 140*a*, water may be introducible. For example, water may be introducible from the water guide structure 181*a* of the stop bracket 180 in the upper area of the first vertically extending sealing profile 140*a*. By the water introduction structure 145*a*, the water may be transferred to the first vertically extending sealing profile 140*a*, especially to the channel in the first vertically extending sealing profile 140*a*. From the channel, the water may be extractable or drainable from the first vertically extending sealing profile 140*a*.

As described above, the first and/or second vertically extending sealing profiles 140*a*, 140*b* may be formed at least in two pieces or be formed exactly in two pieces. The upper area may correspond to the second portion. In particular, the second portion comprises the indentation and/or the water introduction structure 145*a*.

LIST OF REFERENCE SYMBOLS

100 interior swing door
100*p* interior swing door
120*a*, 120*b* door panel
130*a*, 130*b* door panel element
140*a*, 140*b* sealing profile
141*a* upper area sealing profile
145*a* water introduction structure
150 portal
160 sealing member
160*p* sealing member
161 sealing lip
161*p* bulge
180 stop bracket
181 portion
181*a* water guide structure
182 abutment area
185 seal member
186 rib

What is claimed is:

1. Interior swing door, comprising:
a door panel and
a portal in which a swinging motion into an interior is executable by said door panel to open or close said interior,
wherein said door panel, in said swinging motion, at least partly travels beyond an area formed by said portal and said door panel in a closed state, wherein said portal comprises a sealing member horizontally extending in an upper area, that overlies in the closed state of said interior swing door an upper area of said door panel, wherein said door panel comprises at least one door panel element and at least one vertically extending sealing profile that is mounted at said door panel element and comes to rest against another sealing profile or against said portal in the closed state, wherein said vertically extending sealing profile has a height lower than a height of said door panel element so that said vertically extending sealing profile, during a swinging motion of said door panel, travels underneath said horizontally extending sealing member without contacting said horizontally extending sealing member.

2. The interior swing door of claim 1, wherein said interior swing door comprises a stop bracket, wherein a sealing lip of said horizontally extending sealing member abuts said stop bracket.

3. The interior swing door of claim 2, wherein said sealing lip of said horizontally extending sealing member abuts said stop bracket in the closed state of said interior swing door.

4. The interior swing door of claim 2, wherein said sealing lip of said horizontally extending sealing member abuts said stop bracket both in the closed state of said interior swing door and in the opened state of said interior swing door.

5. The interior swing door of claim 2, wherein said stop bracket comprises an abutment area which said sealing lip of said horizontally extending sealing member abuts in said closed and/or opened state of said interior swing door.

6. The interior swing door of claim 3, wherein a flexible downwards protruding section of a stop block, which an upper area of said vertically extending sealing profile abuts in the closed state of said interior swing door, extends below said abutment area.

7. The interior swing door of claim 2, wherein said stop bracket is inserted between a left and right area of said horizontally extending sealing member.

8. The interior swing door of claim 7, wherein said stop bracket is arranged substantially centered in relation to said horizontal extension of said horizontally extending sealing member.

9. The interior swing door of claim 2, wherein said stop bracket comprises a water guide structure extending horizontally, to collect and laterally drain off entering water from said stop bracket.

10. The interior swing door of claim 9, wherein said water guide structure is formed in said portion of a stop block extending flexibly protruding downwards below said abutment area.

11. The interior swing door of claim 2, wherein said stop bracket comprises at least one lateral seal member, said lateral seal member being at least partly compressed or deformed in the closed state of said interior swing door.

12. The interior swing door of claim 2, wherein said stop bracket comprises plastic or consists of plastic.

13. The interior swing door of claim 12, wherein said stop block consisting of the same material as that of said horizontally extending sealing member or consisting of plastic that is harder than that of said horizontally extending sealing member.

14. The interior swing door of claim 1, wherein said vertically extending sealing profile comprises in the upper area a water introduction structure.

15. The interior swing door of claim 1, wherein said door panel element comprises glass or consists of glass by at least 50% by weight.

16. The interior swing door of claim 1, wherein said horizontally extending sealing member and/or said vertically extending sealing profile comprise elastomer or consist of elastomer.

17. The interior swing door of claim 1, wherein said door panel is coupled to a door panel drive.

18. The interior swing door of claim 1, wherein said door panel is a first door panel, said door panel element is a first door panel element, and said vertically extending sealing profile is a first vertically extending sealing profile, said interior swing door comprising a second door panel with a second door panel element and a second vertically extending sealing profile.

19. A vehicle with an interior swing door, comprising:
a door panel, and
a portal in which a swinging motion into an interior is executable by said door panel to open or close said interior,
wherein said door panel, in said swinging motion, at least partly travels beyond an area formed by said portal and said door panel in the closed state, wherein said portal comprises a sealing member horizontally extending in an upper area, that overlies in the closed state of said interior swing door an upper area of said door panel,
wherein said door panel comprises at least one door panel element and at least one vertically extending sealing profile that is mounted at said door panel element and comes to rest against another sealing profile or against said portal in the closed state,
wherein said vertically extending sealing profile has a height lower than a height of said door panel element so that said vertically extending sealing profile, during a swinging motion of said door panel, travels underneath said horizontally extending sealing member without contacting said horizontally extending sealing member.

20. A utility vehicle with an interior swing door, wherein the interior swing door comprising:
a door panel, and
a portal in which a swinging motion into an interior is executable by said door panel to open or close said interior,
wherein said door panel, in said swinging motion, at least partly travels beyond an area formed by said portal and said door panel in the closed state, wherein said portal comprises a sealing member horizontally extending in an upper area, that overlies in the closed state of said interior swing door an upper area of said door panel,
wherein said door panel comprises at least one door panel element and at least one vertically extending sealing profile that is mounted at said door panel element and comes to rest against another sealing profile or against said portal in the closed state,
wherein said vertically extending sealing profile has a height lower than a height of said door panel element so that said vertically extending sealing profile, during a swinging motion of said door panel, travels underneath said horizontally extending sealing member without contacting said horizontally extending sealing member.

* * * * *